US010867375B2

(12) United States Patent
Schafer et al.

(10) Patent No.: US 10,867,375 B2
(45) Date of Patent: Dec. 15, 2020

(54) FORECASTING IMAGES FOR IMAGE PROCESSING

(71) Applicant: Siemens Healthcare GmbH, Erlangen (DE)

(72) Inventors: Sebastian Schafer, Madison, WI (US); Abhishek Bafna, Hoffman Estates, IL (US); John Baumgart, Hoffman Estates, IL (US); Christian Kaethner, Forchheim (DE); Christopher Rohkohl, Escaldes-Engordany (AD)

(73) Assignee: Siemens Healthcare GmbH, Erlangen (DE)

( * ) Notice: Subject to any disclaimer, the term of this patent is extended or adjusted under 35 U.S.C. 154(b) by 93 days.

(21) Appl. No.: 16/262,151

(22) Filed: Jan. 30, 2019

(65) Prior Publication Data

US 2020/0242744 A1 Jul. 30, 2020

(51) Int. Cl.
| | |
|---|---|
| *G06K 9/00* | (2006.01) |
| *G06T 5/50* | (2006.01) |
| *G06T 5/00* | (2006.01) |
| *G06T 5/20* | (2006.01) |
| *G06K 9/62* | (2006.01) |
| *G06T 15/08* | (2011.01) |

(52) U.S. Cl.
CPC ............ *G06T 5/50* (2013.01); *G06K 9/628* (2013.01); *G06K 9/6217* (2013.01); *G06T 5/002* (2013.01); *G06T 5/20* (2013.01); *G06T 15/08* (2013.01); *G06T 2207/10081* (2013.01); *G06T 2207/10116* (2013.01); *G06T 2207/20024* (2013.01); *G06T 2207/20076* (2013.01); *G06T 2207/20081* (2013.01); *G06T 2207/20084* (2013.01); *G06T 2207/20221* (2013.01); *G06T 2207/20224* (2013.01)

(58) Field of Classification Search
CPC .. G06T 5/50; G06T 5/20; G06T 5/002; G06T 15/08; G06T 2207/10081; G06T 2207/20224; G06T 2207/20084; G06T 2207/20076; G06T 2207/10116; G06T 2207/20221; G06T 2207/20081; G06T 2207/20024; G06K 9/628; G06K 9/6217
See application file for complete search history.

(56) References Cited

U.S. PATENT DOCUMENTS

| | | | |
|---|---|---|---|
| 2006/0245640 A1* | 11/2006 | Szczuka | G06T 5/20 382/154 |
| 2007/0013710 A1* | 1/2007 | Higgins | G06K 9/00208 345/581 |
| 2012/0141042 A1* | 6/2012 | Iketani | G06T 3/4053 382/238 |
| 2012/0230563 A1* | 9/2012 | Vik | G06T 7/0012 382/128 |
| 2018/0085083 A1* | 3/2018 | Star-Lack | A61B 6/4085 |
| 2018/0137389 A1* | 5/2018 | Mathieu | G06K 9/00718 |
| 2018/0253624 A1* | 9/2018 | Schafer | G06K 9/03 |
| 2018/0336677 A1* | 11/2018 | Sloan | G06T 7/30 |
| 2019/0104940 A1* | 4/2019 | Zhou | G06T 11/008 |

(Continued)

*Primary Examiner* — Aaron W Carter (57) ABSTRACT

Systems and methods are provided for image forecasting of image processing. A trained image forecaster may be used to generate a virtual image based on prior actual images. The virtual image may be preprocessed to generate an intermediate image. The intermediate image may then be used to process the next actual image to generate a final image.

20 Claims, 6 Drawing Sheets

(56) References Cited

U.S. PATENT DOCUMENTS

| | | | |
|---|---|---|---|
| 2019/0108904 A1* | 4/2019 | Zhou | G06N 3/08 |
| 2019/0286938 A1* | 9/2019 | Backhus | G06T 15/08 |
| 2019/0318474 A1* | 10/2019 | Han | G06K 9/6267 |
| 2019/0333219 A1* | 10/2019 | Xu | G06T 7/0014 |
| 2019/0370969 A1* | 12/2019 | Katzmann | G06T 7/0014 |
| 2020/0065945 A1* | 2/2020 | Schafer | G06T 5/50 |
| 2020/0175733 A1* | 6/2020 | Yu | A61B 6/00 |
| 2020/0211188 A1* | 7/2020 | Gao | G06N 3/04 |
| 2020/0242744 A1* | 7/2020 | Schafer | G06K 9/628 |

\* cited by examiner

FORECASTING IMAGES FOR IMAGE PROCESSING

TECHNICAL FIELD

The present disclosure generally relates to images processing, and more particularly to forecasting images for image processing.

BACKGROUND

Projection radiography is a form of radiography and medical imaging that generates two-dimensional (2D) images by x-ray radiation. One type of projection radiography is angiography, which is a common method used to represent blood vessels based on diagnostic imaging methods, such as x-ray or Magnetic Resonance Tomography (MRT). For an improved representation of the vessels under examination, Digital Subtraction Angiography (DSA) has been developed. DSA is fluoroscopy technique used in interventional radiology to clearly visualize blood vessels in a bony or dense soft tissue environment. Images are produced by subtracting a 'pre-contrast image' or the mask from subsequent images acquired after the contrast medium has been introduced into a structure or tissue of interest. A time series of these images can be used to provide time-resolved or time-varying data that shows the development of the structure or tissue of interest over time.

Radiography imaging involves radiation exposure, which may result in various adverse health effects for the patient, such as nausea and vomiting. A common goal is to minimize the radiation dose so as to reduce such side effects. However, there is usually a trade-off between the radiation dose and image noise. Generally, the lower the radiation dose, the higher the image noise. De-noising techniques may be required to improve the quality of images generated by lower radiation dose.

SUMMARY

Described herein are systems and methods for forecasting images for image processing. In accordance with one aspect, a trained image forecaster is used to generate a virtual image based on prior actual images. The virtual image may be preprocessed to generate an intermediate image. The intermediate image may then be used to process the next actual image to generate a final image.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings.

DETAILED DESCRIPTION

In the following description, numerous specific details are set forth such as examples of specific components, devices, methods, etc., in order to provide a thorough understanding of implementations of the present framework. It will be apparent, however, to one skilled in the art that these specific details need not be employed to practice implementations of the present framework. In other instances, well-known materials or methods have not been described in detail in order to avoid unnecessarily obscuring implementations of the present framework. While the present framework is susceptible to various modifications and alternative forms, specific embodiments thereof are shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention. Furthermore, for ease of understanding, certain method steps are delineated as separate steps; however, these separately delineated steps should not be construed as necessarily order dependent in their performance.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of an interventional or therapeutic procedure, which may include times when the radiation source is either on or off. From time to time, for convenience of description, CT imaging data (e.g., cone-beam CT imaging data) may be used herein as an exemplary imaging modality. It will be appreciated, however, that data from any type of imaging modality including but not limited to x-ray radiographs, MRI (magnetic resonance imaging), PET (positron emission tomography), PET-CT (computed tomography), SPECT (single photon emission computed tomography), SPECT-CT, MR-PET, 3D ultrasound images or the like may also be used in various implementations.

Unless stated otherwise as apparent from the following discussion, it will be appreciated that terms such as "segmenting," "generating," "registering," "determining," "aligning," "positioning," "processing," "computing," "selecting," "estimating," "detecting," "tracking," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, implementations of the present framework are not described with reference to any particular programming language. It will be appreciated that a variety of programming languages may be used.

As used herein, the term "image" refers to multi-dimensional data composed of discrete image elements (e.g., pixels for 2D images, voxels for 3D images, doxels for 4D datasets). The image may be, for example, a medical image of a subject collected by CT (computed tomography), MRI (magnetic resonance imaging), ultrasound, or any other medical imaging system known to one of skill in the art. The image may also be provided from non-medical contexts, such as, for example, remote sensing systems, electron microscopy, etc. Although an image can be thought of as a function from $R^3$ to R, or a mapping to $R^3$, the present methods are not limited to such images, and can be applied to images of any dimension, e.g., a 2D picture, 3D volume or 4D dataset. For a 2- or 3-Dimensional image, the domain of the image is typically a 2- or 3-Dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

The terms "pixels" for picture elements, conventionally used with respect to 2D imaging and image display, "voxels" for volume image elements, often used with respect to 3D imaging, and "doxels" for 4D datasets can be used interchangeably. It should be noted that the 3D volume image is itself synthesized from images obtained as pixels on a 2D sensor array and displays as a 2D image from some angle of view. Thus, 2D image processing and image analysis techniques can be applied to the 3D volume images. In the description that follows, techniques described as operating upon doxels may alternately be described as operating upon the 3D voxel data that is stored and represented in the form of 2D pixel data for display. In the same way, techniques that operate upon voxel data can also be described as operating upon pixels. In the following description, the variable x is used to indicate a subject image element at a particular spatial location or, alternately considered, a subject pixel. The terms "subject pixel", "subject voxel" and "subject doxel" are used to indicate a particular image element as it is operated upon using techniques described herein.

Typically, image de-noising is performed on currently acquired images through spatial and frequency domain filters, as well as in the temporal domain filters. Prior actual images may be incorporated to a certain extent and temporal averaging may be performed. However, temporal filtering has a considerable blurring effect because the human body is under constant motion, even when lying on the examination table (e.g., breathing, cardiac motion, bowel motion), and interventional devices may change positions from frame to frame. As a result, image quality may be degraded.

One aspect of the present framework optimally guides image processing (e.g., temporal domain image filtering) by forecasting the movement (or change) inside the image (e.g., x-ray image). Such image forecasting enables correlation of pixel regions, which in turn minimizes motion blur introduced by temporal filtering. The framework may combine prior knowledge of the image series that is currently acquired, as well as prior knowledge of the general behavior of the image content. The framework implements machine vision based on deep learning techniques (e.g., deep neural networks or deep convolutional networks) and massive training sets. In some implementations, the deep learning techniques make use of long-short term memory (LSTM) networks, which are subsets of convolutional neural networks that are geared towards context awareness.

The framework may include a forecaster, a classifier and an image processing unit. The forecaster and classifier may be trained using an adversarial training method, which increases the robustness of the deep learning model by making the model less sensitive to noise or adversary. The forecaster serves to predict (or generate) a new image (e.g., 2D x-ray image) based on prior actual images available. The classifier serves to detect whether an input image is a virtual (or synthetic) image generated by the forecaster or an actual (or real) image acquired by an actual imaging device at a particular time point in the image series. The image processing unit may then perform, for example, temporal filtering based on the predicted image to improve image quality. Such image filtering advantageously enables considerable radiation dose reduction while keeping image quality stable. It is understood that while a particular application directed to filtering or de-noising 2D x-ray images may be shown herein, the technology is not limited to the specific implementations illustrated.

Figure 1:
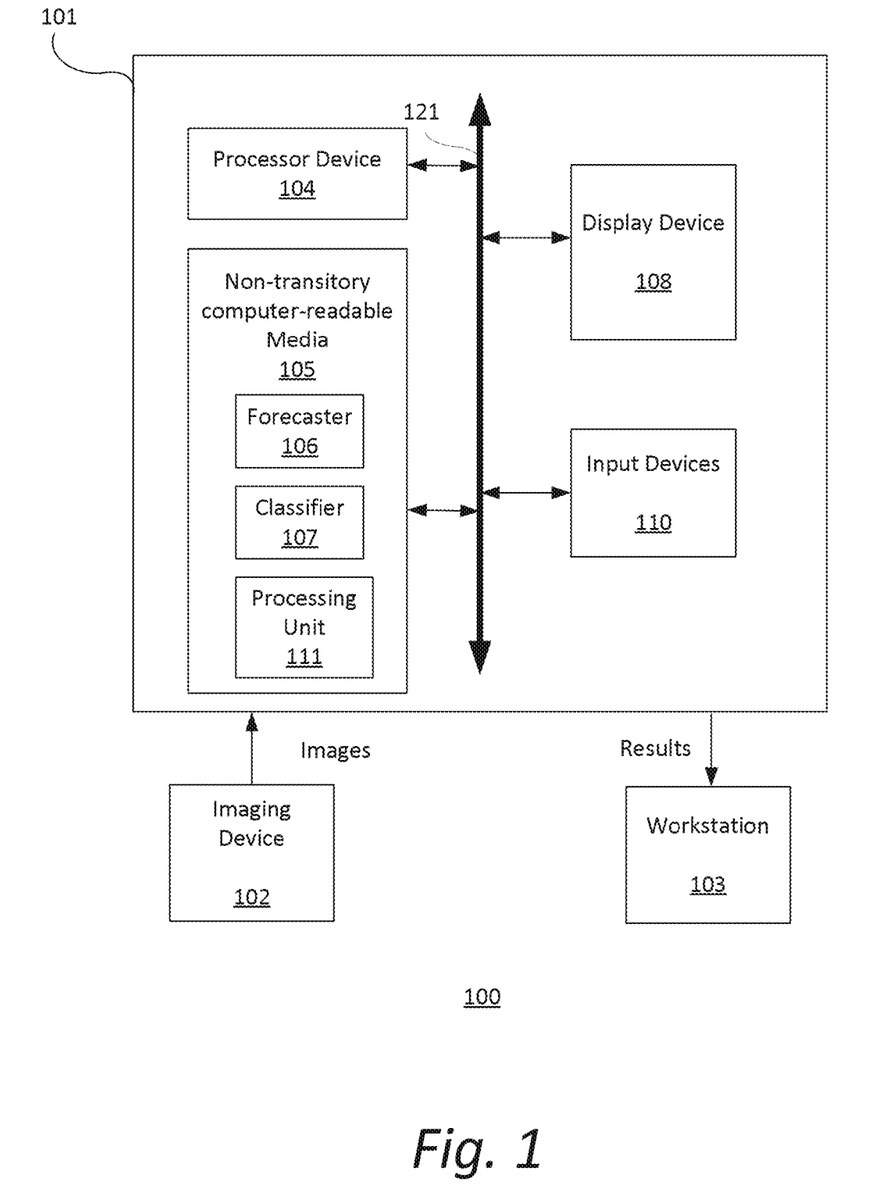
FIG. 1 is a block diagram illustrating an exemplary system.

FIG. 1 is a block diagram illustrating an exemplary system 100. The system 100 includes a computer system 101 for implementing the framework as described herein. Computer system 101 may be a desktop personal computer, a portable laptop computer, another portable device, a mini-computer, a mainframe computer, a server, a cloud infrastructure, a storage system, a dedicated digital appliance, a communication device, or another device having a storage sub-system configured to store a collection of digital data items. In some implementations, computer system 101 operates as a standalone device. In other implementations, computer system 101 may be connected (e.g., using a network) to other machines, such as imaging device 102 and workstation 103. In a networked deployment, computer system 101 may operate in the capacity of a server (e.g., thin-client server, such as Syngo®.via by Siemens Healthcare), a client user machine in server-client user network environment, or as a peer machine in a peer-to-peer (or distributed) network environment.

Computer system 101 may include a processor device or central processing unit (CPU) 104 coupled to one or more non-transitory computer-readable media 105 (e.g., computer storage or memory), a display device 108 (e.g., monitor) and various input devices 110 (e.g., mouse or keyboard) via an input-output interface 121. Computer system 101 may further include support circuits such as a cache, a power supply, clock circuits and a communications bus. Various other peripheral devices, such as additional data storage devices and printing devices, may also be connected to the computer system 101.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in one or more non-transitory computer-readable media 105. In particular, the present techniques may be implemented by a forecaster 106, a classifier 107 and a processing unit 111. Non-transitory computer-readable media 105 may include random access memory (RAM), read-only memory (ROM), magnetic floppy disk, flash memory, and other types of memories, or a combination thereof. The computer-readable program code is executed by processor device 104 to process images or images acquired by, for example, an imaging device 102. As such, the computer system 101 is a general-purpose computer system that becomes a specific purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 105 may be used for storing image sets, patient records, knowledge base, and so forth. Such data may also be stored in external storage or other memories. The external storage may be implemented using a database management system (DBMS) managed by the processor device 104 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

The imaging device 102 may be a radiology scanner, such as an x-ray or a CT scanner, for acquiring images. The workstation 103 may include a computer and appropriate peripherals, such as a keyboard and a display device, and can be operated in conjunction with the entire system 100. For example, the workstation 103 may communicate with the imaging device 102 so that the images collected by the imaging device 102 can be rendered at the workstation 103 and viewed on a display device.

The workstation 103 may communicate directly with the computer system 101 to display processed images and/or output image processing results. The workstation 103 may include a graphical user interface to receive user input via an input device (e.g., keyboard, mouse, touch screen, voice or video recognition interface, etc.) to manipulate visualization and/or processing of the images. For example, the user may view the processed images, and specify one or more view adjustments or preferences (e.g., zooming, cropping, panning, rotating, changing contrast, changing color, changing view angle, changing view depth, changing rendering or reconstruction technique, etc.), navigate to a particular region of interest by specifying a "goto" location, navigate (e.g., stop, play, step through, etc.) temporal volumes of the images set, and so forth.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

Figure 2:
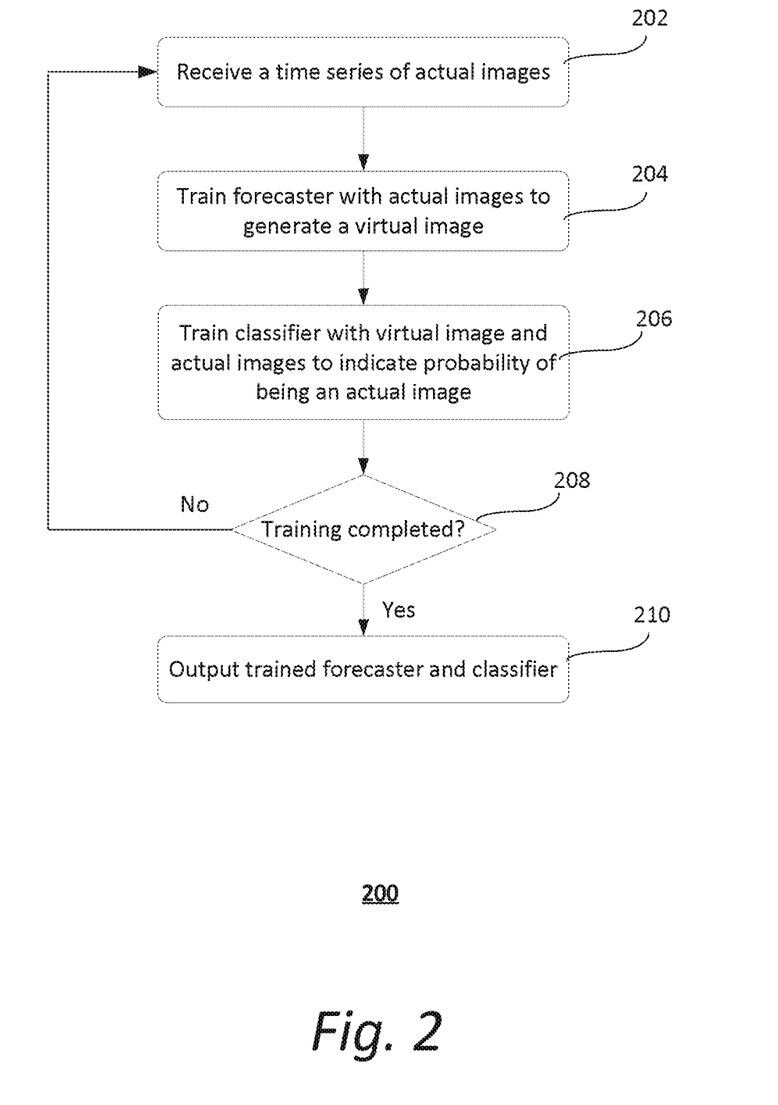
FIG. 2 shows an exemplary adversarial training method performed by a computer system.

FIG. 2 shows an exemplary adversarial training method 200 performed by a computer system. It should be understood that the steps of the method 200 may be performed in the order shown or a different order. Additional, different, or fewer steps may also be provided. Further, the method 200 may be implemented with the system 100 of FIG. 1, a different system, or a combination thereof.

At 202, forecaster 106 receives a time series of actual images of an object of interest. Such actual images may be a set of N real images that have been sequentially acquired by, for example, imaging device 102. N may be any predetermined integer greater than 1 (e.g., 10). The time series of actual images may include video frames of time-varying data. In some implementations, the time-varying data is a set of x-ray images that are acquired by, for example, performing a rotational scan or static acquisition using imaging device 102.

Imaging device 102 may be a scanner or C-arm system with a single imaging plane or multiple imaging planes. For example, imaging device 102 may be a flat-panel based x-ray scanner that includes at least one pair of x-ray source and x-ray detector. Alternatively, imaging device 102 may include a rotating CT gantry covering at least one pair of x-ray source and x-ray detector. In other implementations, imaging device 102 is an MR projection scanner. In yet other implementations, imaging device 102 is a rotating optical CT gantry covering at least one pair of light source and optical detector. Other types of imaging device 102, such as angular sampling ultrasound, may also be used.

The object of interest may be any biological object identified for investigation or examination, such as a portion of a patient's or subject's brain, heart, leg, arm, and so forth. The object of interest may include one or more vessel-like structures (e.g., blood vessels, arteries, vascular tree or network, etc.). The one or more vessel-like structures may be dynamic or time-varying structures that can be filled with a contrast agent or medium for observing its propagation over time.

At 204, forecaster 106 is trained with the time series of actual images to generate a virtual image. Forecaster 106 may be trained to predict the virtual image as the next image of the time series. In some implementations, forecaster 106 is a deep neural network-based system that can efficiently recognize and model spatial-temporal relationships in the input time series of images. Forecaster 106 may be a deep neural network based on convolutional long short-term memory (LSTM) blocks. Convolutional structures are incorporated in both input-to-state and state-to-state transitions. An LSTM block may include a cell, an input gate, an output gate and a forget gate. The LSTM block remembers values over arbitrary time intervals and the three gates regulate the flow of information into and out of the block. Multiple successive convolutional LSTM blocks with varying kernel sizes may be stacked to form an encoding and forecasting structure. The outputs from all intermediate states from each block may be fed into a 3D-convolutional block of appropriate kernel size to output a volume of the same size as the input volume.

At 206, classifier 108 is trained with the virtual image and the actual images to indicate the probability of the input image being an actual image (or a virtual image). More particularly, classifier 108 is trained to take as input a virtual image (i.e., generated by forecaster 106) or actual image (i.e., real image acquired by an imaging device) and output a probability of the input image being an actual (or virtual) image. Classifier 108 may be a deep convolutional network. The deep convolutional network may include a set of convolutional blocks arranged as convolutional, non-linear activation, batch normalization and pooling layers, and so forth. The deep convolutional network may also contain some skip connections that connect earlier layers to latter ones, or dense connections that connect all layers without any loss of information. The deep convolutional network may also contain inception modules having parallel convolutional blocks.

In some implementations, classifier 108 includes three convolutional blocks, each having a convolutional layer of kernel size 5×5 with a leaky rectified linear activation function followed by a batch normalization layer. The output from these blocks is flattened followed by a dense layer with 64 channels with leaky rectified linear unit (ReLU) activation. This may be followed by a dropout layer, and finally another dense layer with 2 channels with sigmoid activation function. The outputs are probabilities of the input image being a virtual image or an actual image.

Both the forecaster 106 and the classifier 108 may be trained simultaneously, the goal of the forecaster 106 being to produce an image that looks as real as possible, and the goal of the classifier 108 being to recognize the image generated by the forecaster 106.

At 208, the framework determines if training is completed. Training may be completed if the overall loss function value for the both the forecaster 106 and the classifier 108 is below a predetermined threshold value.

If training is not completed, steps 202 through 206 are repeated. Steps 202 through 206 are repeated using the next time series of N actual images available (e.g., discarding the first image of the previous time series and adding the most recent actual image). If a total number of M new actual images are received for processing, where M is less than N, M oldest images in the previous time series may be discarded. This is performed to train the forecasting model with changing images, enabling it to learn, for example, the progression of contrast in the images.

If training is completed, the method proceeds to 210. At 210, the framework outputs the trained forecaster 106 and classifier 108.

Figure 3:
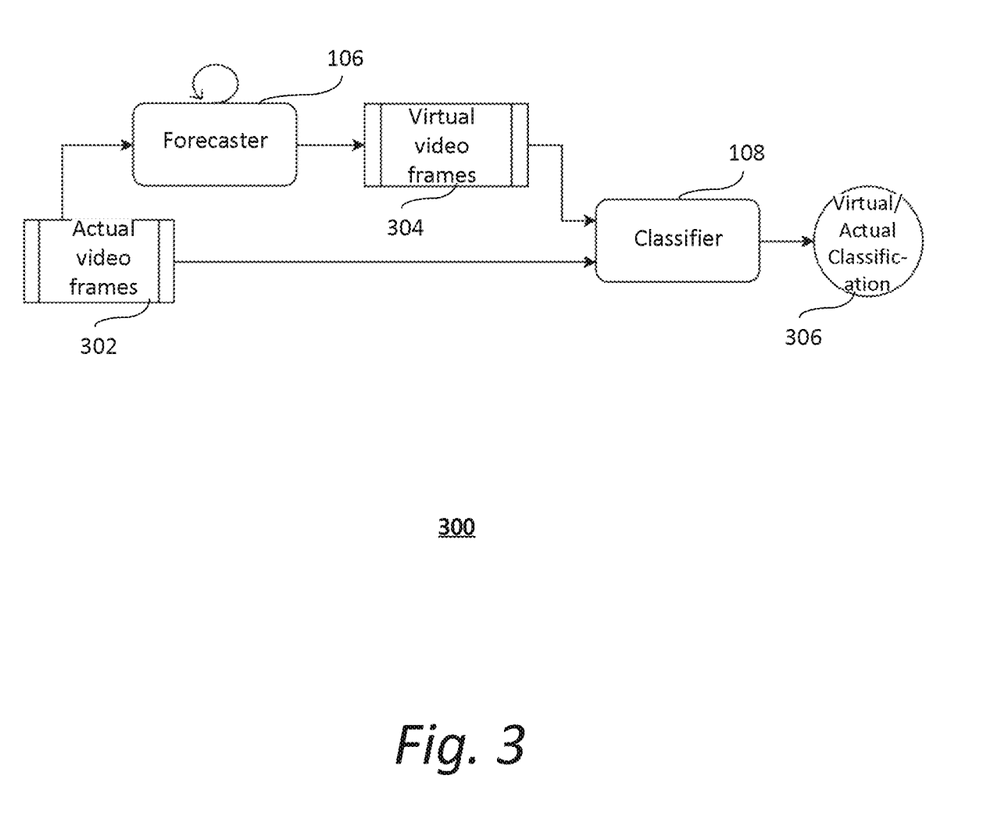
FIG. 3 shows an exemplary adversarial training pipeline.

FIG. 3 shows an exemplary adversarial training pipeline 300. The pipeline 300 is similar to a generative adversarial network (GAN), wherein the forecaster 106 acts as the generator while the classifier 108 acts as the discriminator. The forecaster 106 and the classifier 108 may be trained for several iterations. The training sequence for each iteration may be as follows: (1) a time series of input actual video frames 302 is received; (2) forecaster 106 is trained for a predetermined number of epochs to generate virtual video frames 304; (3) output batch of generated virtual video frames 304 is coupled with actual video frames 302 to train the classifier 108 for this batch. Weights of the classifier 108 are then frozen and the entire network is then trained end-to-end with a set of previous video frames 302 as the input and the virtual frames 304 being classified as actual (or real) as the output.

Figure 4:
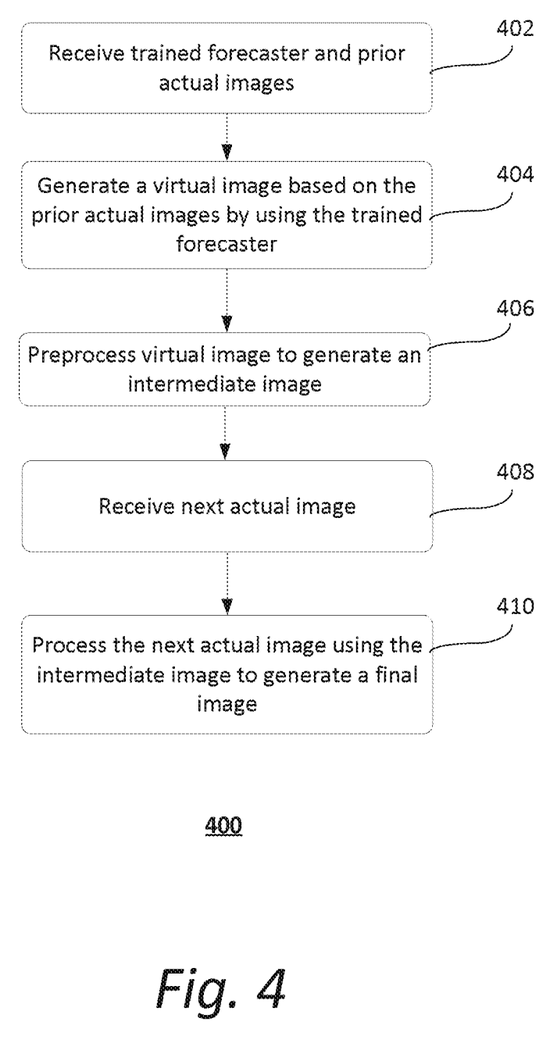
FIG. 4 shows an exemplary image processing method performed by a computer system.

FIG. 4 shows an exemplary image processing method 400 performed by a computer system. It should be understood that the steps of the method 400 may be performed in the order shown or a different order. Additional, different, or fewer steps may also be provided. Further, the method 400 may be implemented with the system 100 of FIG. 1, a different system, or a combination thereof.

At 402, processing unit 111 receives trained forecaster 106 and prior actual images. The prior actual images may be a time series of N actual or real images of the object of interest that are sequentially acquired by, for example, imaging device 102. The prior actual images may include 2D video frames of time-varying data. In some implementations, the time-varying data is a set of x-ray images that are acquired by, for example, performing a rotational scan or static acquisition using imaging device 102.

The forecaster 106 may be trained by, for example, the process 200 or 300, as previously described. The forecaster 106 may be activated after the first N prior actual images have been received. The forecaster 106 may have been trained to efficiently recognize and model spatiotemporal relationships in the input prior actual images.

At 404, processing unit 111 generates a virtual image based on the prior actual images by using the trained forecaster 106. The trained forecaster 106 generates (or predicts) the virtual image as the next image in the time series.

Figure 5:
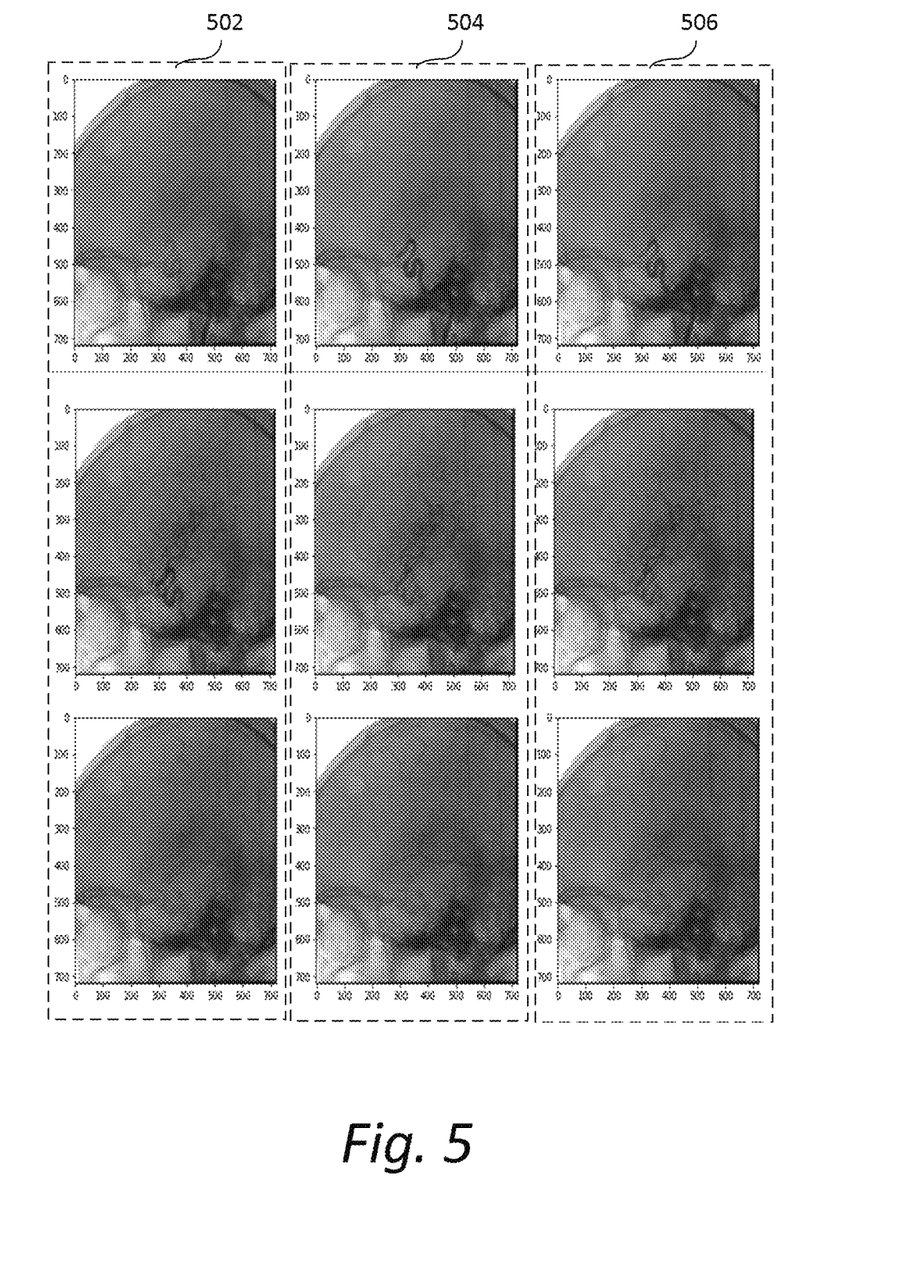
FIG. 5 shows exemplary images in a time series.

FIG. 5 shows exemplary images in a time series. The left column of images 502 show current frames. The middle column of images 504 show the true or actual next frames in the time series, while the right column of images 506 show the next frames predicted by the trained forecaster 106 based on the current frame and 5 previous frames of the time series.

Figure 6:
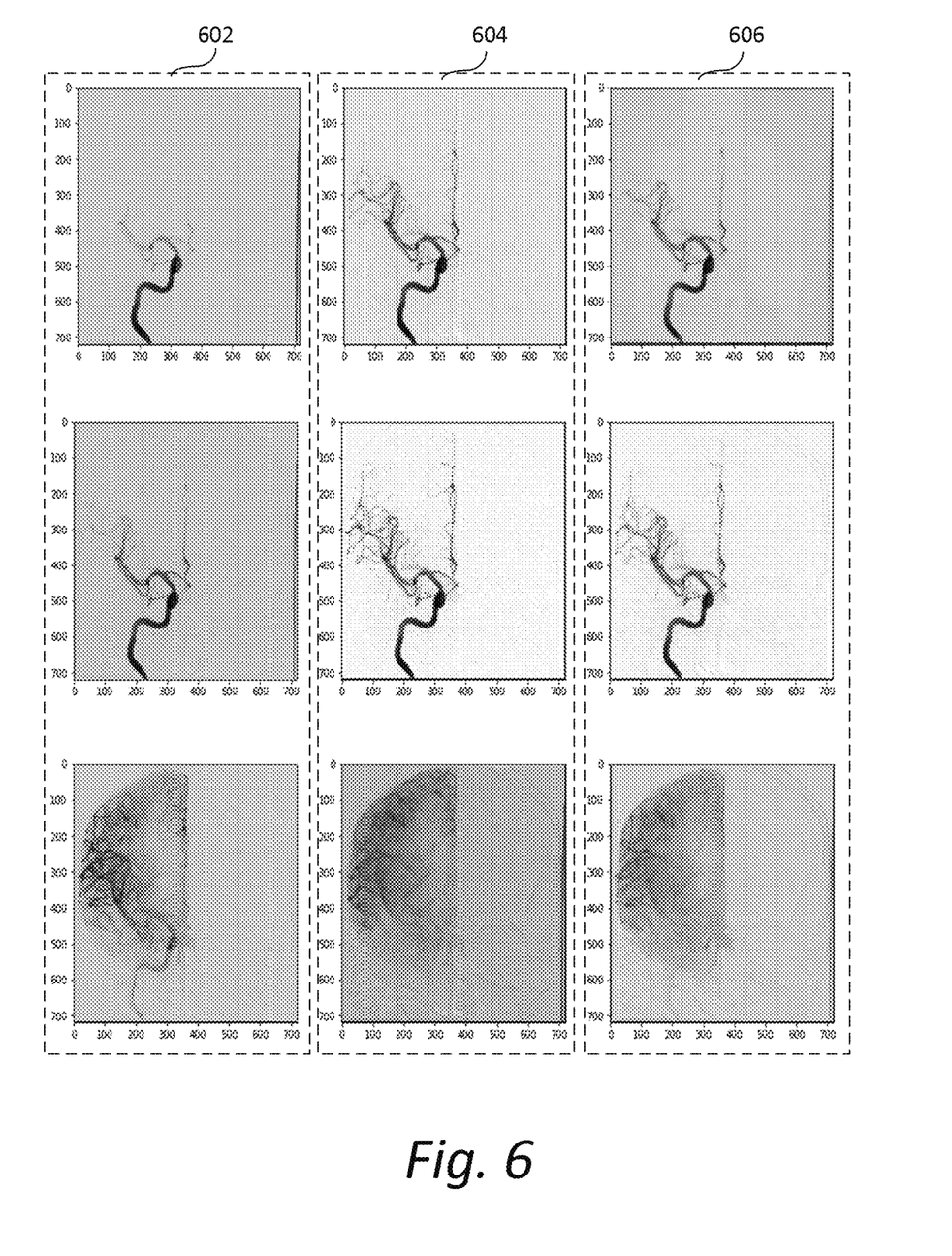
FIG. 6 shows exemplary images in another time series.

FIG. 6 shows exemplary images in another time series. The left column of images 602 show current frames. The middle column of images 604 show the true or actual next frames in the time series, while the right column of images 506 show the next frames predicted by the trained forecaster 106 based on the current frame and 5 previous frames of the time series.

Returning to FIG. 4 at 406, processing unit 111 preprocesses the virtual image $I_v$. In some implementations, the virtual image $I_v$ is preprocessed by registering it with the prior actual images. Such registration may be performed before the next actual image $I_A$ arrives from, for example, imaging device 102. The registration may involve spatially transforming the virtual image $I_v$ to align with the prior actual images. The registration may be, for example, a 2D-to-2D deformable image registration. After registration, temporal filters (e.g., weighted averaging) may be applied to the registered image to reduce noise content and generate an intermediate image $I_f$.

At 408, processing unit 111 receives the next actual image $I_A$ acquired by, for example, the imaging device 102. The next actual image is acquired at the next time point of the time series of N prior images.

At 410, processing unit 111 processes the next actual image $I_A$ using the intermediate image $I_f$ to generate a final image $I_s$. In some implementations, processing unit 111 subtracts the intermediate image $I_f$ from the next actual image $I_A$ to generate the final image $I_s$. The final image $I_s$ may show areas of strong discrepancy that indicate newly introduced image content, such as contrast agent. These foreground areas of the final image $I_s$ may be isolated and filtered with a lower strength filter. The background of the final image $I_s$ may be filtered with a higher strength filter. Such filters may include, but are not be limited to, spatial and/or temporal filters for de-noising, contrast enhancing, smoothing and super-resolving filtering. These filters may be adaptive, patch-based (i.e., localized) or non-localized in nature. A combination of kernel-based and wavelet-based filters may be used for frequency-based filtering of the images. Temporal filtering may be achieved by using optical flow techniques, isotropic/anisotropic diffusion filtering and/or motion-compensated techniques.

While the present framework has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

What is claimed is:

1. One or more non-transitory computer-readable media embodying instructions executable by a machine to perform operations for image processing comprising:
   training a forecaster using an adversarial training method;
   receiving prior actual images;
   generating, by the trained forecaster, a virtual image based on the prior actual images;
   registering the virtual image with the prior actual images;
   filtering the registered virtual image to generate an intermediate image;

generating a final subtracted image by subtracting the intermediate image from a next actual image; and applying a filter to the final subtracted image.

2. The one or more non-transitory computer-readable media of claim 1 including further instructions executable by the machine to train the forecaster with a classifier to indicate a probability of an input image being an actual image generated by an imaging device or the virtual image generated by the trained forecaster.

3. The one or more non-transitory computer-readable media of claim 2 wherein the classifier comprises a deep convolutional network.

4. The one or more non-transitory computer-readable media of claim 1 wherein the trained forecaster comprises a deep neural network based on convolutional long short-term memory (LSTM) blocks.

5. A system for image processing, comprising:
a non-transitory memory device for storing computer readable program code; and
a processor in communication with the memory device, the processor being operative with the computer readable program code to perform:
receiving a trained forecaster and prior actual images,
generating, by the trained forecaster, a virtual image based on the prior actual images,
preprocessing the virtual image to generate an intermediate image,
receiving a next actual image, and
generating a final processed image by processing the next actual image using the intermediate image.

6. The system of claim 5 wherein the processor is operative with the computer readable program code to train the forecaster with a classifier using an adversarial training method.

7. The system of claim 6 wherein the processor is operative with the computer readable program code to train the forecaster with the classifier, wherein the classifier is trained to indicate a probability of an input image being an actual image generated by an imaging device or the virtual image generated by the trained forecaster.

8. The system of claim 7 wherein the classifier comprises a deep convolutional network.

9. The system of claim 5 wherein the trained forecaster comprises a deep neural network based on convolutional long short-term memory (LSTM) blocks.

10. The system of claim 7 wherein the processor is operative with the computer readable program code to train the forecaster with the classifier by iteratively
receiving input actual images,
training the forecaster for a predetermined number of epochs based on the input actual images to generate virtual images, and
training the classifier with the virtual images and the input actual images.

11. The system of claim 5 wherein the processor is operative with the computer readable program code to preprocess the virtual image by
registering the virtual image with the prior actual images, and
filtering the registered virtual image to generate the intermediate image.

12. The system of claim 5 wherein the processor is operative with the computer readable program code to process the next actual image by subtracting the intermediate image from the next actual image to generate the final processed image.

13. The system of claim 5 wherein the processor is operative with the computer readable program code to apply a lower strength filter to foreground areas of the final processed image and a higher strength filter to a background of the final processed image.

14. The system of claim 5 wherein the processor is operative with the computer readable program code to apply a spatial filter to the final processed image.

15. The system of claim 5 wherein the processor is operative with the computer readable program code to apply a temporal filter to the final processed image.

16. A method of image processing, comprising:
receiving a trained forecaster and prior actual images;
generating, by the trained forecaster, a virtual image based on the prior actual images;
preprocessing the virtual image to generate an intermediate image;
receiving a next actual image; and
generating a final processed image by processing the next actual image using the intermediate image to generate a final image.

17. The method of claim 16 further comprises training the forecaster with a classifier, wherein the classifier is trained to indicate a probability of an input image being an actual image generated by an imaging device or the virtual image generated by the forecaster.

18. The method of claim 16 wherein preprocessing the virtual image comprises:
registering the virtual image with the prior actual images; and
filtering the registered virtual image to generate the intermediate image.

19. The method of claim 16 wherein processing the next actual image comprises subtracting the intermediate image from the next actual image to generate the final processed image.

20. The method of claim 16 further comprises applying a temporal filter to the final processed image.

* * * * *